Feb. 13, 1923.
E. H. VINCENT.
LOCKABLE AND TILTABLE STEERING WHEEL.
FILED NOV. 24, 1919.
1,445,053.
2 SHEETS—SHEET 1.
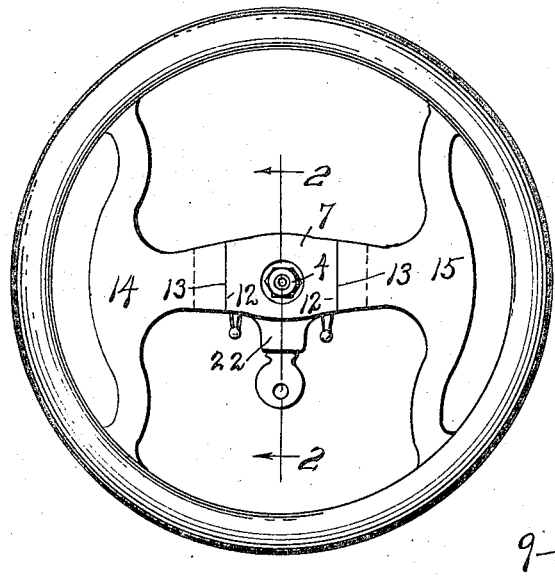
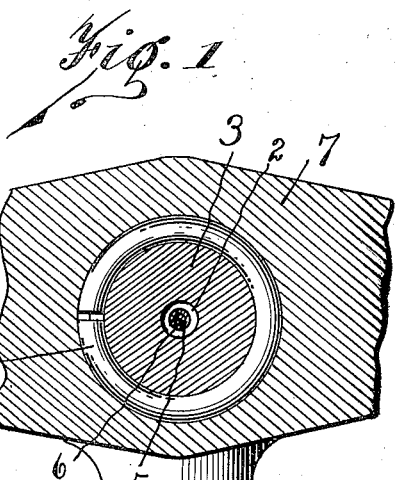
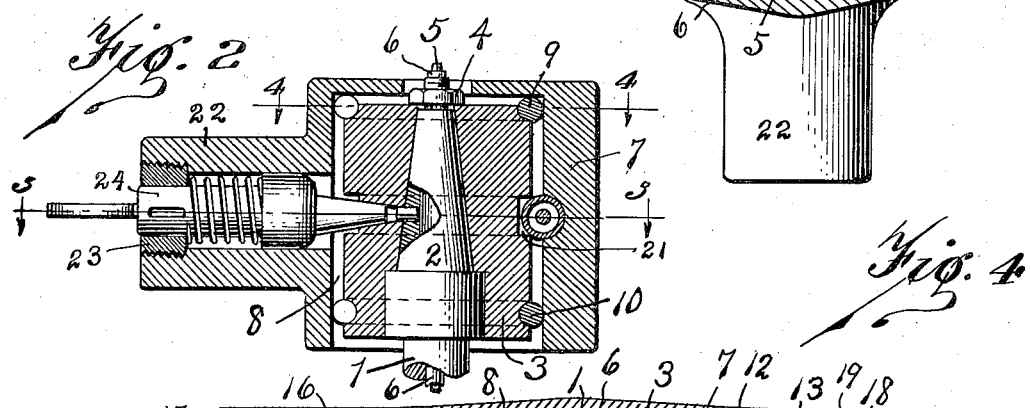
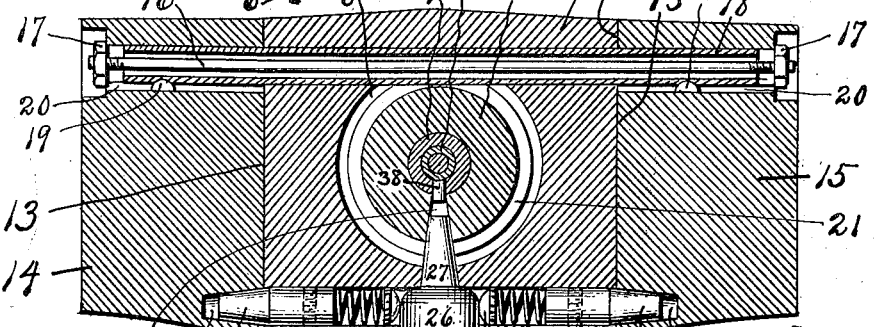
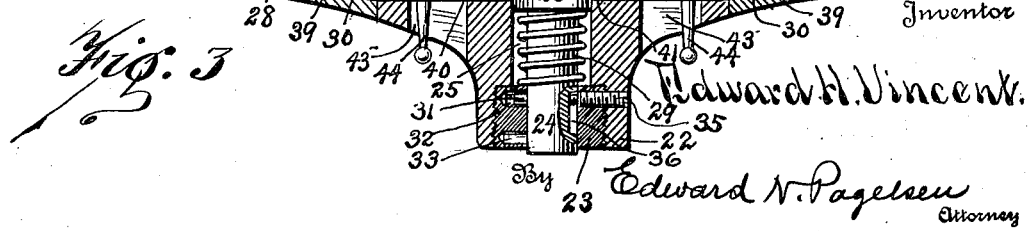
Inventor
Edward H. Vincent.
By Edward N. Pagelsen
Attorney

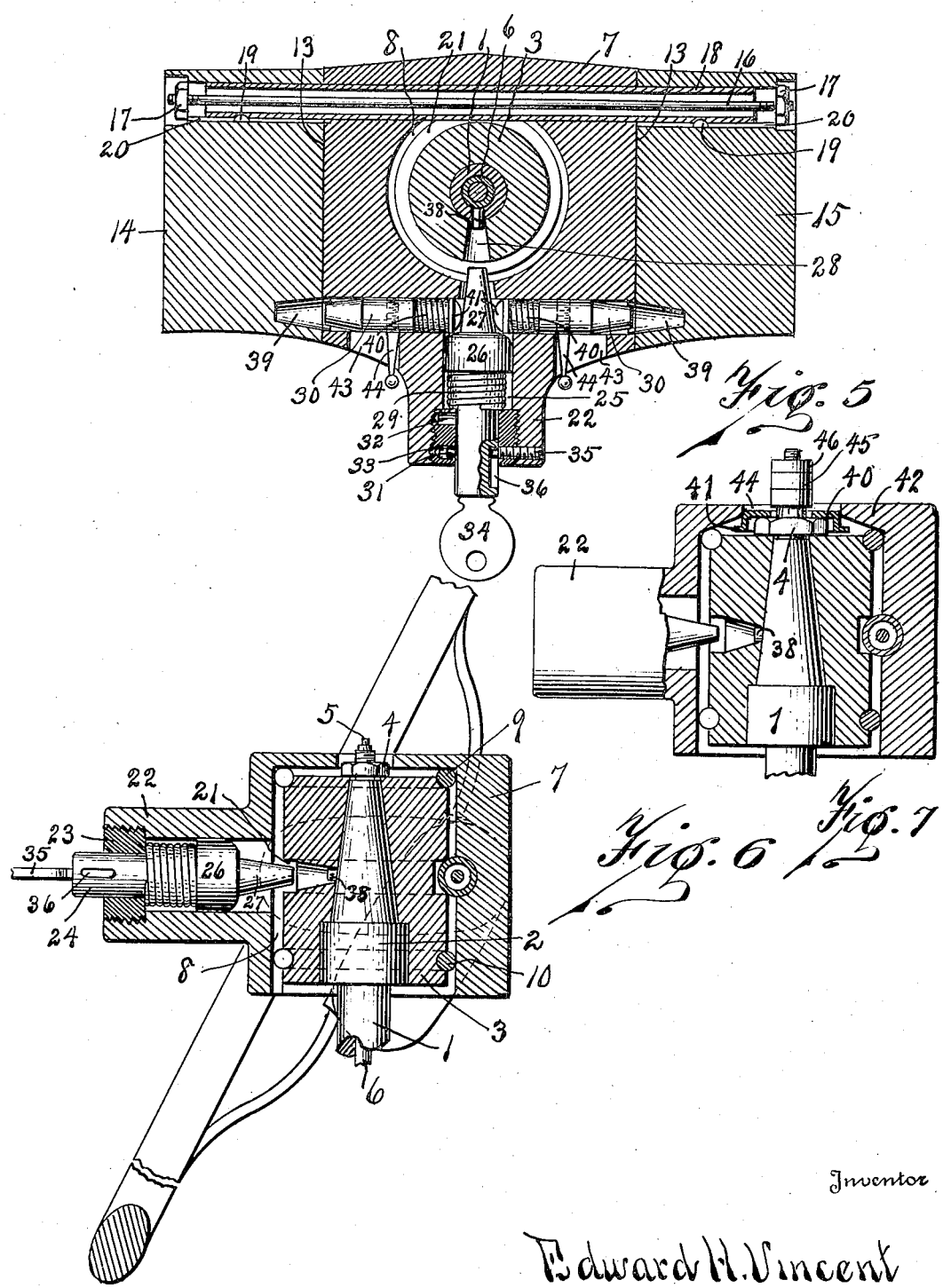

Patented Feb. 13, 1923.

1,445,053

UNITED STATES PATENT OFFICE.

EDWARD H. VINCENT, OF DETROIT, MICHIGAN.

LOCKABLE AND TILTABLE STEERING WHEEL.

Application filed November 24, 1919. Serial No. 340,303.

*To all whom it may concern:*

Be it known that I, EDWARD H. VINCENT, a citizen of the United States, and residing at Detroit, in the county of Wayne and State of Michigan, have invented a new and Improved Lockable and Tiltable Steering Wheel, of which the following is a specification.

This invention relates to steering wheels for motor vehicles of the same general character as that shown in my United States Patent No. 1,269,341, dated June 11, 1918, and its object is to provide a steering wheel which may be attached to and detached from the steering post at will, such operations being controlled by a key operated lock, and which may be tilted out of its usual plane at right angles to the steering post in order to afford more space for the driver of the vehicle to get into and out of his seat.

This invention consists in the combination of a steering post and a bushing secured thereon, said bushing being provided with a circumferential groove, a head rotatably mounted on the bushing and a wheel pivoted to the head, and a pivot in the form of a tube which extends tangentially of said bushing in the groove therein on which the wheel is mounted and which prevents the head moving longitudinally of the steering post.

It further consists in providing the head and the arms of the spider with parallel faces and in a bolt passing through said tube and through the portions of the spider adjacent said head whereby the spider arms may be drawn tightly against the sides of the head.

It also consists in slidable latch bolts mounted in the head at an angle to the sides which contact with the spider, springs mounted in the head for moving the bolts outwardly, and pins on the bolts whereby the bolts may be moved, the sides of the spider being provided with recesses to receive the locking pins.

It also consists in a locking bolt mounted in the head and adapted to slide longitudinally, the bushing being provided with a recess to receive the inner end of this locking bolt, a spring to move the bolt to its inner position, and a lock body connected to the bolt whereby the bolt may be moved outwardly and whereby the bolt may be locked in its inner or outer position at will, the lock body having an enlarged portion which may be placed between the latch bolts and prevents unlocking movement.

It also consists in the details of construction illustrated in the accompanying drawings and particularly pointed out in the claims.

In the accompanying drawings, Fig. 1 is a plan of a steering wheel embodying the present invention. Fig. 2 is a section on the line 2—2 of Fig. 1. Figs. 3 and 4 are sections on the lines 3—3 and 4—4 of Fig. 2 respectively. Fig. 5 is a section similar to Fig. 3 with the parts moved to unlocking position. Fig. 6 is a section similar to Fig. 2 with the parts moved to unlocking position. Fig. 7 is another modification thereof.

Similar reference characters refer to like parts throughout the several views.

The steering wheel shown in the drawings is mounted on a hollow steering rod 1 having a tapering upper end 2 to which a cylindrical bushing 3 is secured by means of a nut 4. Within the post 1 are the usual rod 5 to control the spark and tube 6 to control the fuel. Normally rotatable on the bushing 3 is a steering head 7 having a cylindrical bore 8 which fits the split rings 9 and 10 which are mounted in grooves in the bushing 3 in the manner shown in Figs. 2 and 6. This head 7 is provided with parallel faces 12 against which the faces 13 on the spider arms 14 and 15 of the steering wheel are firmly held by means of a bolt 16 and the nuts 17 thereon. This bolt 16 extends through a tube 18 which is secured in the parts 14 and 15 by means of the small keys 19 which are in the key-ways 20 in the parts 14 and 15. This tube 18 constitutes the pivot on which the steering wheel is rotatably mounted so that it may be swung from normal operative position to that shown in Fig. 6, and as it extends across the groove 21 in the bushing 3, it prevents the head from being removed from the steering rod. In addition thereto, these nuts 17 draw the spider arms 14 and 15 against the faces 12 of the steering head and thus cause sufficient friction to keep the wheel from swinging except under considerable pressure. By rigidly connecting the tube 18 to the spider arms 14 and 15, these are prevented from twisting relative to each other and, together with the rim, will act as a rigid unit.

A substantially cylindrical boss 22 extends from one side of the head and in it is screwed a hollow plug 23 in whose bore is slidable the outer cylindrical portion 24 of a key operated lock. The boss 22 has a cylindrical bore 25 in which is slidable the enlarged portion or collar 26 of the body of this lock from which the locking pin 27 extends inwardly and is adapted to fit in the hole 28 in the bushing 3. A spring 29 on this cylinder 24 presses against the collar 26 and against the plug 23 and normally tends to hold the locking pin 27 in the hole 28 in the bushing and thus locks the steering head 7 to the bushing 3 and to the steering post.

The lock is provided with a pin 31 which may be moved radially inwardly out of the holes 32 and 33 whenever the key 34 is properly turned. When the parts are in the position shown in Fig. 3, this pin 31 will be in the hole 32, but when the key is inserted and turned, the lock body and the pin 27 can be pulled outwardly to the position shown in Fig. 5 against the tension of the spring 29. The lock body 24 is prevented from turning by means of a screw pin 35 whose inner end extends into the groove 36 in the lock body.

The bushing 3 is attached to the end 2 of the steering rod 1 in any desired manner, and in addition to the nut 4, I may use a pin 38 extending into the steering post and into the hole 28 in the bushing. It will be noticed that it is impossible to remove this pin and to remove the bushing from the steering rod without first removing the steering wheel, particularly the head 7. This can only be done by removing the screw 35 and taking out the plug 24 so as to withdraw the end of the locking pin 27 from the groove 21 in the bushing, and then removing the bolt 16 and tube 18.

As stated before, the wheel proper is tiltably mounted on the tube 18 carried by the steering head 7. Latch bolts 30 are slidably mounted in the head 7 and are adapted to be forced into the recesses 39 in the spider arms 14 and 15 of the steering wheel by means of springs 40 which engage the small bearing blocks 41. The steering head is formed with slots 43 in which the small pins 44 are movable, which pins are connected to the latch pins 30 as shown in Figs. 3 and 5.

Normally when the wheel is in operative position the latch pins 20 will be held in the position shown in Fig. 3, the springs 40 being of such length that the latch pins cannot be withdrawn from the recesses 39. But when the lock body 24 with its collar 26 are pulled back to the position shown in Fig. 5, then the small bearing blocks 41 are permitted to move inwardly and the springs 40 have enough space in which to be depressed sufficiently to permit the latch bolts 30 to be entirely withdrawn from the recesses 39. The wheel may then be swung down to the position shown in Fig. 6 to give additional space for leaving and entering the driver's seat. The wheel may be tilted up to operative position at any time and again released until the lock body is pushed in to the position shown in Fig. 3. It will be understood that the key 34 cannot be withdrawn from the lock unless the pin 31 is in either of the holes 32 and 23.

The locking bolt which secures the steering head to the bushing and therefore to the steering rod and the co-operating latch bolts which prevent the wheel from tilting on its pivot are entirely within the head and the action of the lock is to prevent angular movement between the head and the rod and wheel respectively at the same time. The wheel, head, bushing and rod may be locked to act as a unit or unlocked so as to be entirely free from each other as desired.

In some cases the opening in the steering head for the quadrant tube and the gasoline lever tube is necessarily large, while in others this hole can be restricted. In order to make the heads interchangeable, this opening may be made of maximum size in all of the steering heads as shown in Fig. 7, and then, to prevent the nut 4 from being turned by means of a wrench, a small washer 40, substantially Z-shaped in cross section is placed over the nut with its outer flange 41 extending below the flange 42 on the steering head 43. The washer may be made to fit the bore 44 of this flange 42 so that it may be centered thereby and can accommodate itself to nuts of various heights. The gasoline lever 45 and spark lever 46 will be mounted on their respective tubes after the washer is in position.

The details, sizes and proportions shown in the drawings may all be changed by those skilled in the art without departing from the spirit of my invention as set forth in the following claims.

I claim:—

1. The combination of a steering rod and a steering head mounted thereon, a radially mounted bolt adapted to lock the head to the steering rod, a steering wheel embodying spider arms and a rim, a pivot connecting the spider arms to said head, and a pair of spring held latch bolts mounted in said head and adapted to enter recesses in said spider arms.

2. The combination of a steering rod and a head mounted thereon provided with parallel sides, a pivot extending through the head a distance from the central line of the steering rod at right angles to the sides, a steering wheel mounted on the pivot and embodying a rim and two spider arms having parallel faces spaced apart to receive the head, a pair of latch bolts mounted in the head parallel to the pivot, a spring for each bolt to project it from said parallel sides, said spider arms having recesses to receive the latch bolts, pins projecting from the latch bolts whereby they may be withdrawn from the recess in the spider arms, and a key operated lock adapted to prevent such withdrawal of the latch bolts.

3. The combination of a steering rod and a head mounted thereon and provided with parallel sides, a wheel pivoted on said head and having spider arms adapted to engage said parallel sides of the head, a pair of alined latch bolts mounted in the head and adapted to engage the spider arms to lock the wheel in position, a locking bolt mounted in the head and movable radially of the steering rod, and a lock body connected to said locking bolt and adapted to be moved in and out by the key therefor, said bolt being adapted to move into the space between the inner ends of the latch bolts and prevent the withdrawal thereof.

4. The combination of a steering rod and a head mounted thereoon, a steering wheel pivoted on said head on an axis extending transversely to the steering rod and a distance therefrom, latch bolts mounted in the head parallel to the axis and adapted to be moved outward and inward to engage and disengage the steering wheel, and a locking bolt mounted radially of said steering rod in said head and adapted to lock the head to the steering rod and to hold the latch bolts in engagement with the steering wheel.

5. The combination of a steering rod and a steering head mounted thereon, a radially mounted bolt adapted to lock the head to the steering rod, a steering wheel embodying spider arms and a rim, a pivot connecting the spider arms to said head, and a pair of spring held latch bolts mounted in said head and adapted to enter recesses in said spider arms, said latch bolts being in alinement and movable at an angle to the locking bolt.

6. The combination of a steering rod and a steering head mounted thereon, a radially mounted bolt adapted to lock the head to the steering rod, a steering wheel embodying spider arms and a rim, a pivot connecting the spider arms to said head, and a pair of spring held latch bolts mounted in said head and adapted to enter recesses in said spider arms, said latch bolts being movable toward each other and said locking bolt being slidable longitudinally between the latch bolts.

7. The combination of a steering rod and a steering head mounted thereon, a locking bolt mounted in the head and adapted to connect the head to the steering rod, a steering wheel embodying spider arms and a rim, a pivot connecting the spider arms to said head, a pair of latch bolts mounted in said head and adapted to engage the spider arms, said latch bolts being adapted to move at an angle to the locking bolt, and said locking bolt being movable between the latch bolts when moved to position to connect the head to the steering rod.

8. The combination with a steering wheel embodying a rim and spider arms having parallel opposed faces, a steering head, a supporting member on which said head is rotatably mounted, said member having a circumferential groove, a pivot for said wheel extending through said head tangentially to the bottom of said groove, and having its ends in said spider arms, means to prevent the steering head from turning on said supporting member, and means to prevent the wheel from turning on said pivot.

9. The combination of a steering wheel embodying a rim and spider arms having parallel opposed faces, a steering head, a supporting member on which said head is rotatably mounted, said member having a circumferential groove, and a pivot for said wheel extending through said head tangentially to the bottom of said groove and having its ends in said spider arms.

10. The combination of a steering wheel embodying a rim and spider arms having parallel opposed faces, a steering head, a supporting member on which said head is rotatably mounted, said member having a circumferential groove, and a pivot for said wheel extending through said head tangentially to the bottom of said groove and having its ends in said spider arms whereby the steering head is prevented from being removed from the supporting member until the pivot is withdrawn.

11. In combination, a steering rod and a head mounted thereon, a steering wheel movable on said head, and means mounted entirely within the head to lock the head to the steering rod and to lock the wheel to said head to simultaneously prevent angular movement between the head and the rod and wheel respectively.

12. In combination, a steering wheel embodying a rim and spider arms having parallel opposed faces, a steering head and a pivot extending through the head, said pivot being rigidly connected at its ends in said spider arms and a bolt extending through the pivot to draw the spider arms toward each other.

13. In combination, a steering wheel embodying a rim and spider arms having parallel faces, a steering head, a tubular pivot extending through the steering head and into the spider arms, and a bolt extending through both the spider arms and through the tubular pivot to draw the spider arms into contact with the head.

14. In combination, a steering rod and a bushing mounted thereon, a nut on the rod to hold the bushing in position, a steering head mounted on the bushing and having an inturned flange at one end extending toward said nut and a washer substantially Z-shaped in cross section having one flange resting on said nut and the other extending beneath said flange.

15. In combination, a steering rod, a bushing thereon, a nut to retain the bushing on the steering rod, a steering head mounted on the bushing, and a washer held in position by the head to prevent the removal of the nut.

16. In combination, a steering rod and a head mounted thereon, a steering wheel pivoted on said head, and means mounted entirely within the head to lock the head to the steering rod and to lock the wheel to said head to simultaneously prevent angular movement between the head and the rod and wheel respectively.

17. In combination with a steering shaft, a head thereon, a wheel structure movably mounted on said head, spring actuated means mounted in the head to cause the head to turn with the shaft and simultaneously prevent movement between the wheel structure and said head and to prevent the head turning the shaft and simultaneously permit movement between the wheel structure and said head.

18. In combination, a steering rod, a bushing secured thereto, a head removably mounted on the bushing, a detachable carrying member extending into said head and having engagement with the bushing, a steering wheel removably mounted on said carrying member, said head and steering wheel being held against removal until the carrying member is withdrawn.

19. In combination, a steering rod having an enlarged upper end, a head removably mounted thereon, a detachable carrying member extending into said head and having engagement with the end of the rod, a steering wheel removably mounted on said carrying member, said head and steering wheel being held against removal until the carrying member is withdrawn, and means to prevent removal of the carrying member.

20. In combination with a steering shaft, a head thereon, a wheel structure movably mounted on said head, key controlled means mounted in the head, said means having two positions and when in one position causing the head to turn the shaft and also lock the wheel structure rigid to the head and when in the other position preventing the head turning the shaft and also permitting movement of the wheel structure in respect to said head.

EDWARD H. VINCENT.